United States Patent Office 3,249,571
Patented May 3, 1966

3,249,571
PROCESS FOR PRODUCING AQUEOUS POLYMER DISPERSIONS WITH POLYMERIC N-VINYL ACETAMIDE DISPERSANT
Wilhelm Bartmann, Claus Beermann, Werner Ehmann, and Dieter Ulmschneider, Frankfurt am Main, Germany, assignors to Farbwerke Hoechst Aktiengesellschaft vormals Meister Lucius & Brüning, Frankfurt am Main, Germany, a corporation of Germany
No Drawing. Filed Dec. 17, 1963, Ser. No. 331,126
Claims priority, application Germany, Dec. 20, 1962, F 38,618
12 Claims. (Cl. 260—29.6)

The present invention relates to a process for producing aqueous polymer dispersions.

For many vinyl compounds the most important polymerization process is the free radical polymerization in aqueous dispersion. The properties of the forming polymer dispersions are decisively influenced by the dispersing agent and the polymerization catalyst used. When strongly surface active compounds are used in combination with water-soluble polymerization catalysts, the polymer is obtained in a very finely dispersed form as latex (emulsion polymerization), while highly polymeric, water-soluble organic compounds as dispersing agents and water-insoluble polymerization catalysts yield granular or powdery products (suspension polymerization). An intermediate position takes, for example, the polymerization of vinyl acetate with water soluble polymerization catalysts in the presence of polyvinyl alcohol. In this case a latex-like polymer dispersion is obtained and the kinetics largely correspond to that of an emulsion polymerization, although the polyvinyl alcohol does not form micellae in contrast to the surface active substances required for the emulsion polymerization.

It is an object of the present invention to prepare aqueous polymer dispersions in an especially advantageous manner by polymerizing under known conditions compounds capable of being polymerized in the presence of free radical polymerization catalysts and having the formula

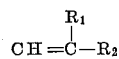

wherein $R_1$ stands for hydrogen or $CH_3$ and $R_2$ stands for chlorine, $C_6H_5$, $OOC.R_3$ or $COOR_4$ in which $R_3$ represents hydrogen or a monovalent radical of a saturated aliphatic hydrocarbon having 1–18 carbon atoms and preferably 1–4 carbon atoms, and $R_4$ represents a monovalent radical of a saturated aliphatic hydrocarbon having 1–8 carbon atoms and preferably 1–4 carbon atoms, in aqueous phase while stirring and using as dispersing agent polymeric open-chain N-vinyl amides. The polymeric open-chain N-vinyl amides to be used according to the invention derive monomers of the formula

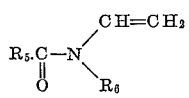

in which $R_5$ and $R_6$ stand for hydrogen or a monovalent hydrocarbon radical having 1–20 carbon atoms, preferably a monovalent radical of a saturated aliphatic hydrocarbon having 1–4 carbon atoms. With the use of water-soluble polymerization catalysts stable, latex-like polymer dispersions are obtained whereas with the use of water-insoluble polymerization catalysts coarsely granular polymer dispersions are formed.

Monomers which can be used in the process of the invention are, for example, styrene, esters of vinyl alcohol and monobasic saturated aliphatic carboxylic acids with 1–18 carbon atoms, preferably 1–4 carbon atoms, for example vinyl acetate, vinyl propionate and vinyl butyrate, furthermore esters of acrylic and methacrylic acid and monohydric saturated aliphatic alcohols with 1–8 and preferably 1–4 carbon atoms, and vinyl chloride. By the process of the invention there can be prepared not only homopolymers of the monomers mentioned above, but also copolymers, for example copolymers of the aforesaid vinyl esters and esters of maleic acid and monohydric saturated aliphatic alcohols with 1–8 and preferably 1–4 carbon atoms. The process of the manufacture can be used, for example, for making a copolymer of vinyl acetate and dibutyl maleate.

Suitable dispersing agents in the process of the invention are polymers, i.e. homopolymers and copolymers of open-chain N-vinyl amides, for example, poly-N-vinylacetamide, poly-N-vinyl-N-methyl acetamide, poly-N-vinyl-N-ethyl acetamide, poly-N-vinyl propionamide, poly-N-vinyl-N-methyl propionamide, poly-N-vinyl-N-methyl isobutyramide, and poly-N-vinyl-N-methyl stearic acid amide. Besides the homopolymers of open-chain N-vinyl amides there may be used water-soluble copolymers or copolymers dispersed in water of the open-chain-N-vinylamides with other compounds capable of being polymerized in the presence of free radical polymerization catalysts. The latter copolymers shall contain at least 5% and preferably at least 20% of the vinyl amides defined above. Suitable copolymers are, for example, copolymers of N-vinyl-N-methyl acetamide with esters of vinyl alcohol and monobasic saturated aliphatic carboxylic acids with 1–8 carbon atoms, preferably 1–4 carbon atoms; moreover copolymers with N-vinyl lactams with 4–6 carbon atoms, for example N-vinyl pyrrolidone and N-vinyl caprolactam; copolymers with acrylic or methacrylic acid, copolymers with esters of acrylic or methacrylic acid and monohydric saturated aliphatic alcohols with 1–8 carbon atoms, preferably 1–4 carbon atoms and with esters of maleic acid and monohydric saturated aliphatic alcohols with 1–8 and preferably 1–4 carbon atoms. Still further, there may be used mixtures of the specified dispersing agents with one another and with other dispersing agents, for example with surface active colloids or with other water-soluble organic colloids. In general, the open-chain poly-N-vinyl amides or the copolymers of open-chain N-vinyl amides are used in a concentration of 0.1–50% calculated on the weight of water used.

As water-soluble polymerization catalysts there may be mentioned water-soluble inorganic persulfates, for example ammonium or alkali metal persulfates; percarbonates, for example ammonium or alkali metal percarbonates; hydrogen peroxide; water-soluble azo compounds; for example salts of $\gamma,\gamma'$-azo-bis-($\gamma$-cyano) pentanoic acid and 2,2'-diguanyl-2,2'-azo-propane-dihydrochloride, water-soluble organic peroxides such as succinyl peroxide; furthermore redox systems such as persulfate/bisulfite, persulfate/formaldehyde sodium sulfoxylate, either alone or with the addition of metal salts. From among the water-insoluble polymerization catalysts to be used in the process of the invention there may be named organic peroxides, for example benzoyl peroxide, organic hydroperoxides, azo compounds such as $\alpha,\alpha'$-azodiisobutyronitrile. The free radical polymerization catalysts are applied in a concentration commonly used in free radical polymerization, e.g. in a concentration of 0.01 to 2%, calculated on the weight of the monomer phase.

The reaction temperature applied depends, in the first place, on the polymerization catalyst and on the monomer used. In general, the polymerization is carried out at a temperature in the range of from 40 to 120° C., advantageously 60 to 95° C. For some monomers it may be advisable to operate with the exclusion of oxygen, for example under a blanket of nitrogen. Sometimes it may also be advantageous to operate under elevated or reduced pressure. The ratio of water to monomer used can vary within wide limits, for example within the range of 95:5 to 30:70, preferably 70:30 to 40:60. The most suitable ratio of water to monomer depends, inter alia, on the speed of agitation, the desired grain and particle size and on the desired solids concentration.

Owing to the fact that the process of the invention can be varied within wide limits as to concentration, molecule size and type of open-chain poly-N-vinyl amide and type and concentration of catalyst, polymer dispersions can be made from the defined monomers having the most varying properties. When, for example, water-soluble polymerization catalysts are used, optimum properties can be adjusted for each application, such as size and shape of polymer particles, viscosity of latex and resistance to water and reemulsifiability of a film made from the dispersion.

In the polymerization according to the invention in addition to the homo- or copolymerization of the monomer or monomers a graft polymerization of the monomer or monomers takes place on the poly-N-vinyl amide as shown, for example in the following Example 8. This grafting is responsible for many favorable properties of the polymer dispersions.

The latex-like polymer dispersions produced by the process of the invention can be used, for example, as paints and binders.

The following examples serve to illustrate the invention but they are not intended to limit it thereto.

*Example 1*

In a 2 liter, three-necked flask provided with a flat blade paddle agitator, reflux condenser and thermometer, 20 grams of poly-N-vinyl-N-methyl acetamide having a K-value of 72.2 and 2 grams of sodium acetate were dissolved in 380 grams of water. The flask was heated to 80° C., a solution of 2 grams of potassium persulfate in 20 grams of water was added and then 400 grams of vinyl acetate were uniformly dropped in in the course of 165 minutes, while stirring at 75–80° C. At the end of the vinyl acetate addition 250 milligrams of potassium persulfate dissolved in 30 cc. of H₂O were introduced with a pipet and the temperature of the flask was maintained at 80–90° C. for 90 minutes. After having cooled while stirring, a stable, latex-like dispersion of polyvinyl acetate was obtained having a viscosity of 32 poises. The residual monomer content was 0.40%. On standing for several months only a minor sedimentation could be observed in the dispersion.

*Example 2*

A solution of 6 grams of poly-N-vinyl-N-methyl acetamide (K-value 31.5), 0.6 gram of sodium laurylsulfate, 2 grams of sodium acetate and 0.6 gram of potassium persulfate in 460 cc. of water was filled in a 2 liter three-necked flask as defined in Example 1. The solution was heated to 80° C. and while stirring (120 revolutions per minute) for 5 hours and 10 minutes a mixture of 351 grams of vinyl acetate and 173 grams of dibutyl maleate and a solution of 0.9 gram of potassium persulfate in 30 cc. of water were uniformly added at a temperature of 75–85° C. The mixture was heated for a further 90 minutes at 80–90° C. and then allowed to cool while stirring. A stable, latex-like dispersion of a copolymer of vinyl acetate/dibutyl maleate was obtained having a viscosity of 75 poises.

*Example 3*

335 grams of vinyl acetate and 165 grams of maleic acid dibutyl ester were polymerized as specified in Example 2 in a solution of 3.5 grams of poly-N-vinyl-N-methyl acetamide (K-value 84), 0.6 gram of sodium laurylsulfate, 2 grams of sodium acetate and 25 grams of an oxethylated oleyl alcohol in 460 cc. of water. A very stable, latex-like dispersion of a copolymer of vinyl acetate/dibutyl maleate having a viscosity of 250 poises was obtained. The residual monomer content was about 0.6%, the solid content about 52%. The viscosity of the latex could be adjusted within a wide range by varying the K value of the poly-N-vinyl acetamide and the concentration. When the same test was carried out without poly-N-vinyl-N-methyl acetamide the dispersion broke in the course of the polymerization.

*Example 4*

Vinyl acetate and dibutyl maleate were copolymerized as described in Example 3. Instead of poly-N-vinyl-N-methyl acetamide there was used poly-N-vinyl-N-ethyl acetamide as dispersion stabilizer. With the use of 6 grams of poly-N-vinyl-N-ethyl acetamide (K-value 79.1) a dispersion was obtained which has a viscosity of 24 poises.

*Example 5*

60 grams of poly-N-vinyl-N-methyl acetamide (K-value 49.5) and 100 milligrams of ammonium persulfate were dissolved in 175 cc. of water. 12 grams of styrene were added while stirring and the mixture was heated under a blanket of nitrogen of 2 hours at 70° C., for 2 hours at 80° C. and for 2 hours at 90° C. A stable latex-like dispersion having a high viscosity was obtained. At the end of the polymerization the mixture contained 0.46% of monomeric styrene.

*Example 6*

In a 250 cc. four-necked flask, provided with stirrer, thermometer, condenser and dropping funnel, 30 grams of poly-N-vinyl-N-methyl acetamide having a K-value of 31.5 and 200 milligrams of potassium persulfate were dissolved in 70 grams of water. The mixture was heated to 80° C. and 30 grams of methacrylic acid methyl ester were dropped in in the course of 60 minutes while stirring. The polymerization mixture was maintained at 85° C. for a further 120 minutes. After cooling and stirring, a latex-like dispersion was obtained having a viscosity of 565 centipoises. The dispersion had a solid content of about 45%.

*Example 7*

8 cc. of ethyl acrylate were added to a solution of 22.7 grams of poly-N-vinyl-N-methyl acetamide having a K-value of 37, 2 grams of sodium salt of the sulfuric acid ester of oxethylated nonyl phenol and 50 milligrams of ammonium persulfate in 70 cc. of water and the reaction mixture was heated to 70° C. In the course of 120 minutes, while stirring and with the exclusion of oxygen, further 25 cc. of ethyl acrylate were dropped in and the forming emulsion was stirred for a further 5 hours at 65–70° C. A latex-like dispersion was obtained which was stable for several weeks.

*Example 8*

A solution was prepared from 100 grams of poly-N-vinyl-N-methyl acetamide (K-value 42), 8 grams of sodium salt of the sulfuric acid ester of oxethylated nonyl phenol, 2 cc. of aqueous ammonia solution (25% strength) and 200 milligrams of ammonium persulfate in 280 cc. of water. 56 cc. of ethylhexyl acrylate were added to the solution obtained, the mixture was heated to 80° C. under a blanket of nitrogen and while stirring. Then there were added in the course of 1.5 hours 2 cc. of a 5% solution of ammonium persulfate and after 5 hours 200 cc. of a 0.05% aqueous ammonium persulfate solution and the mixture was again heated for 8 hours at 80° C. A latex-like dispersion was obtained which was still completely stable after 8 weeks. When 20 cc. of the dispersion were concentrated by evaporation under reduced pressure 8.3 grams of residue were obtained. In an extraction with benzene only 0.95 gram of the residue was dissolved and formed a gel. Ethylhexyl acrylate is quantitatively soluble in benzene. When 20 cc. of the dispersion were mixed with 30 cc. of aluminium sulfate solution saturated in the cold 8.1 grams of polymer precipitated. The homopolymer of N-vinyl-N-methyl acetamide cannot be precipitated with aluminium sulfate from a 40% aqueous solution. These results prove that the ethylhexyl acrylate was substantially grafted on the poly-N-vinyl-N-methyl acetamide.

Example 9

1.5 grams of poly-N-vinyl-N-methyl acetamide having a K-value of 72 were dissolved in 150 cc. of water in a 500 cc. three-necked flask, provided with stirrer, thermometer and reflux condenser. The solution was heated to 80° C. and 60 cc. of styrene and 0.4 gram of benzoyl peroxide were added while stirring. Stirring and heating were continued for 8 hours. 57 grams of beads of polystyrene having a medium diameter of 1 mm. were obtained. When the polymerization was carried out without poly-N-vinyl-N-methyl acetamide being added the mixture could no longer be stirred because of the formation of many lumps.

Example 10

In a 500 cc. three-necked flask 100 grams of methylmethacrylate were polymerized while stirring at 70° C. with 0.5 gram of α,α'-azodiisobutyronitrile in a solution of 10 grams of poly-N-vinyl-N-methyl acetamide having a K-value of 72 in 200 cc. of water, oxygen being excluded. After a time of reaction of 6 hours polymethylmethacrylate beads having a medium diameter of 3 mm. were obtained in a good yield. In the same test carried out without poly-N-vinyl-N-methyl acetamide large lumps were rapidly formed, which did not allow further stirring.

Example 11

5 grams of poly-N-vinyl-N-methyl acetamide having a K-value of 72 were dissolved in 500 cc. of water. The solution was heated to 70° C., and while stirring, a solution of 1 gram of benzoyl peroxide in 100 grams of vinyl acetate was added. The temperature was first maintained at 70° C., after about 2 hours it was raised to 80° C. After a total time of polymerization of 5 hours beads of polyvinyl acetate having a medium diameter of 0.1–1 mm. were obtained in a good yield.

Example 12

5 grams of poly-N-vinyl-N-methyl acetamide having a K-value of 76 or 11.5 grams of a copolymer of N-vinyl-N-methyl acetamide with 5%, calculated on the weight of the copolymer, of ethylhexyl acrylate were dissolved in 2.6 liters of desalted water. The solution was forced, together with 1 liter of liquid vinyl chloride, 120 grams of di-n-hexyl-azelainate, 23 grams of vinyl acetate and 4 grams of lauryl peroxide, into a 5 liter autoclave. The mixture was heated to 60° C. while vigorously stirring and maintained at that temperature for 6 hours. About 1,000 grams of a fine-grained, plasticizer-containing vinyl chlorid/vinyl acetate copolymer was obtained. The autoclave and the stirrer were free from deposit. When the monomers were polymerized under identical conditions with the exception that poly-N-vinyl-N-methyl acetamide or the defined copolymer was not added many lumps were formed and the wall of the autoclave and the stirrer were full of deposit.

We claim:

1. A process for the production of aqueous polymer dispersions which comprises the step of polymerizing, in an aqueous phase at a temperature within the range of 40–120° C. under the action of 0.01 to 2%, calculated on the weight of the monomer phase, of a free radical polymerization catalyst, a monomer of the formula

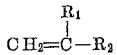

wherein $R_1$ represents a member selected from the group consisting of H and $CH_3$ and $R_2$ represents a member selected from the group consisting of Cl, $C_6H_5$, $OOC.R_3$ and $COO.R_4$, in said $OOC.R_3$ the $R_3$ represents a member selected from the group consisting of hydrogen and a monovalent radical of a saturated aliphatic hydrocarbon with 1–18 carbon atoms and in said $COO.R_4$ the $R_4$ represents a monovalent radical of saturated aliphatic hydrocarbon with 1–8 carbon atoms, in the presence of 0.1 to 50%, calculated on the weight of water used, of a polymer of a monomer of the formula

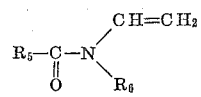

wherein $R_5$ represents a member selected from the group consisting of hydrogen and a monovalent saturated aliphatic hydrocarbon radical with 1–20 carbon atoms and $R_6$ represents a member selected from the group consisting of hydrogen and a monovalent hydrocarbon radical with 1–20 carbon atoms.

2. A process as claimed in claim 1, wherein a member selected from the group consisting of styrene, an ester of vinyl alcohol and a monobasic saturated aliphatic carboxylic acid with 1–18 carbon atoms, an ester of crylic acid and a monohydric saturated aliphatic alcohol with 1–8 carbon atoms, an ester of methacrylic acid and a monohydric saturated aliphatic alcohol with 1–8 carbon atoms and vinyl chloride is polymerized.

3. A process as claimed in claim 1, wherein vinyl acetate is polymerized.

4. A process as claimed in claim 1, wherein styrene is polymerized.

5. A process as claimed in claim 1, wherein ethyl acrylate is polymerized.

6. A process as claimed in claim 1, wherein methyl methacrylate is polymerized.

7. A process as claimed in claim 1, wherein vinyl chloride is polymerized.

8. A process as claimed in claim 1, wherein a water-soluble free radical polymerization catalyst is used.

9. A process as claimed in claim 1, wherein a water-insoluble free radical polymerization catalyst is used.

10. A process as claimed in claim 1, wherein the polymerization is carried out in the presence of poly-N-vinyl-N-methyl acetamide.

11. A process as claimed in claim 1, wherein the polymerization is carried out in the presence of poly-N-vinyl-N-ethyl acetamide.

12. A process as claimed in claim 1, wherein the polymerization is carried out in the presence of poly-N-vinyl-N-methyl acetamide and a copolymer of N-vinyl-N-methyl acetamide and 5% calculated on the weight of the copolymer ethylhexyl acrylate.

No references cited.

MURRAY TILLMAN, *Primary Examiner.*